No. 843,394.  
PATENTED FEB. 5, 1907.

W. B. HAYNES.  
GASKET.  
APPLICATION FILED MAR. 26, 1906.

Witnesses  
Inventor  
William B. Haynes  
By Parsons and Burch and James W. Bevans  
Attorneys

UNITED STATES PATENT OFFICE.

WILLIAM B. HAYNES, OF AKRON, OHIO.

GASKET

No. 843,394.　　Specification of Letters Patent.　　Patented Feb. 5, 1907.

Application filed March 26, 1906. Serial No. 308,062.

*To all whom it may concern:*

Be it known that I, WILLIAM B. HAYNES, a citizen of the United States, residing at Akron, in the county of Summit and State of Ohio, have invented certain new and useful Improvements in Gaskets, of which the following is a specification.

This invention relates to improvements in gaskets for use on cylinder-heads, pipe-joints, &c.; and the object is to provide a simple and improved metallic gasket by means of which a tight joint may be secured between the two parts to be connected.

With the above object in view the invention consists in the novel features of construction hereinafter fully described, particularly pointed out in the claims, and clearly illustrated in the accompanying drawings, in which—

Figure 1:
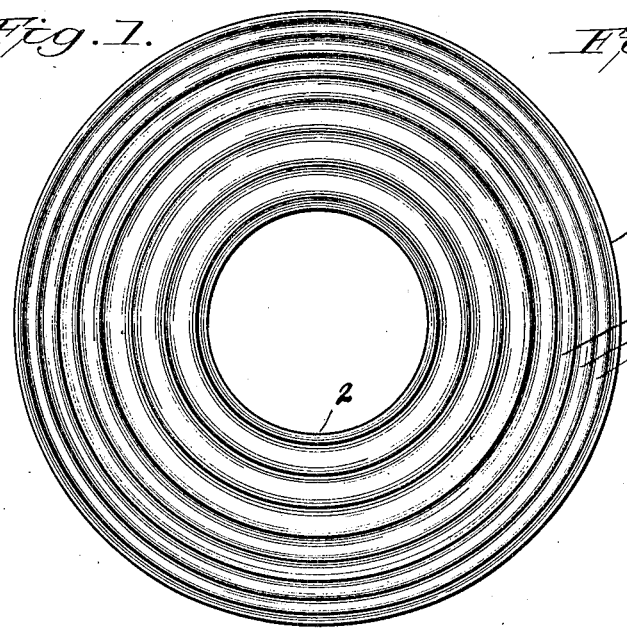
Figure 2:
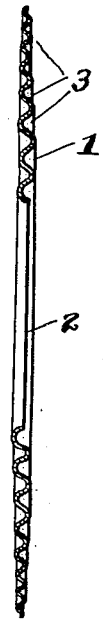
Figure 3:
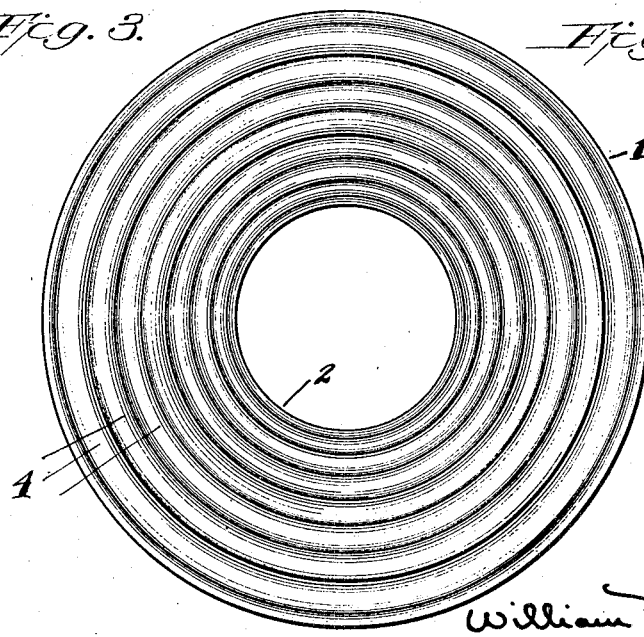

Figure 1 is a face view of a gasket constructed in accordance with my invention; Fig. 2, a sectional view of the same; Fig. 3, a face view of a modified construction, and Fig. 4 a sectional view of the same.

Referring now more particularly to the drawings, Figs. 1 and 2, it will be seen that the improved gasket consists of a circular plate 1, formed of metal, preferably copper, having the central opening 2. The plate is formed with a series of concentric corrugations which decrease in depth, beginning at the inner edge thereof, as clearly shown in Fig. 2. By forming the corrugations of gradually-decreasing depths, beginning at the inner edge of the plate, a better joint is produced, for the reason that where, for instance, the gasket is used between a cylinder and a head the tension produced by tightening the bolts which hold the two parts together decreases from the point of bolting to the center, so that the pressure is greater at the outer circumference of the gasket than at the inner. The deepest corrugations being at the point of least pressure and the shallowest at the point of greatest pressure the pressure is made practically uniform and a perfect joint effected.

In addition to the above advantages or features either of the above constructions produces a stiffer and more firm gasket than if constructed with uniform corrugations.

Figure 4:
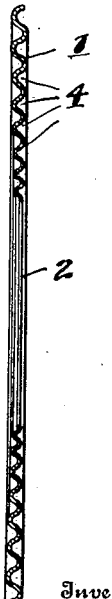

In Figs. 3 and 4 I have shown a gasket in which the corrugations 4 gradually increase in depth, beginning with the inner circumference of the plate. In this construction the deeper corrugations first receive the pressure, and if the latter is not too great the gasket may be used a number of times.

Having thus fully described my invention, what I claim as new, and desire to secure by Letters Patent of the United States, is—

1. A gasket consisting of a metal plate formed with a plurality of concentric corrugations, gradually increasing in depth.

2. A gasket consisting of a metal plate formed with a plurality of concentrically-arranged corrugations of different depths, the corrugations at the inner circumference being of greater depth than those at the outer circumference.

3. A gasket consisting of a metal plate formed with a plurality of concentrically-arranged corrugations gradually decreasing in depth beginning at the inner circumference of the gasket.

In testimony whereof I affix my signature in presence of two witnesses.

WILLIAM B. HAYNES.

Witnesses:
　WADE DE WOODY,
　D. E. WEIR.